United States Patent [19]

Lehmann

[11] 4,397,756

[45] Aug. 9, 1983

[54] METHOD AND COMPOSITION FOR REDUCTION OF FORMALDEHYDE EMISSION IN WOOD COMPOSITE PANELS

[75] Inventor: William F. Lehmann, Tacoma, Wash.

[73] Assignee: Weyerhaeuser Company, Tacoma, Wash.

[21] Appl. No.: 291,705

[22] Filed: Aug. 10, 1981

[51] Int. Cl.$^3$ .......................... C08L 61/24; C09J 5/00
[52] U.S. Cl. ..................................... 252/182; 156/328; 156/336; 427/303; 427/342; 428/528; 428/535; 428/541; 524/17; 524/18; 524/21; 568/422; 252/184
[58] Field of Search ................ 252/182, 184; 156/328, 156/336; 427/303, 342; 428/528, 541, 535; 260/6, 17.3, 17.4 CL, 17.4 ST, 17.4 SG; 524/17, 18, 21; 568/422

[56] References Cited

U.S. PATENT DOCUMENTS 4,238,545  12/1980  Hunsucker et al. ................. 427/342
4,244,846   1/1981  Edler ................................... 156/328

Primary Examiner—Irwin Gluck

[57] ABSTRACT

The invention is a composition of matter and method for its use in reducing formaldehyde emission from wood composite panels bonded with aminoplast resins. The preferred composition comprises urea, a carbohydrate based material such as cooked or gelatinized starch, and an acidic catalyst for the resin. The ratio of urea to carbohydrate based material is in the range of 10:1 to 40:1 while the urea forms from 20–60% of the composition. In use, the composition is preferably sprayed on the wood particles, flakes or fiber in the blender at the same time resin is added. Typical usage is 0.4–3 parts, on a urea basis, added to each 100 parts of dry wood substance. Depending on several factors, the reduction in formaldehyde emission ranges from 60–90% without serious deterioration occurring in any other product physical properties.

5 Claims, No Drawings

METHOD AND COMPOSITION FOR REDUCTION OF FORMALDEHYDE EMISSION IN WOOD COMPOSITE PANELS

FIELD OF THE INVENTION

This invention relates to a method and composition for reduction of formaldehyde vapor emission from wood composite panels bonded with formaldehyde containing adhesives. The method is particularly applicable to panels for interior residential or commercial construction.

BACKGROUND OF THE INVENTION

In recent years, energy consciousness has dictated much tighter construction of home and commercial dwelling units. As one aspect of this, there are now fewer internal air turnovers for any unit of time. In modern mobile homes as one example, when doors and windows are closed air turnovers typically range from 0.15 to 0.6 per hour, averaging about 0.3. While this tight construction has indeed helped to conserve energy it has spawned a host of new problems. Among these are those caused by internally generated moisture and odors. In this latter category, minute quantities of formaldehyde vapor generated from a multitude of internal sources can be cited as one example. Among the sources are tobacco smoking, natural gas cooking, carpeting, permanent press treatment of draperies and upholstering fabrics, and the urea-formaldehyde adhesives used in particleboard decking and in wall paneling. Formaldehyde evolution is usually more of a problem in hot, humid weather. The amounts emitted are very low and the ambient atmosphere of a modern mobile home may contain from 0.1 to 1.5 ppm formaldehyde vapor, or even more under extreme conditions. Typical values would be about 0.3–0.7 ppm. Because of its highly irritating nature to eyes and the nasal mucosa, even these low amounts can cause discomfort to sensitive people.

To cure the problem it is necessary to control all of the sources of formaldehyde. Unfortunately, elimination of one or two sources does not guarantee that the remaining level of formaldehyde will be reduced in proportion to the original contribution of these sources. Effort must be made along multivariate lines of attack to completely resolve the formaldehyde problem. One part of this effort, as represented by the present invention, has been to better control formaldehyde emission from particleboard bonded by formaldehyde containing adhesives. Particleboard decking and cabinetry core products are widely used in mobile homes and are usually regarded as significant contributors to the internal formaldehyde level.

The art has long recognized that formaldehyde emission from composite products, such as particleboard bonded with urea-formaldehyde resins, can be in part controlled by the addition of free urea to the system. Urea acts as a formaldehyde scavenger, both at and subsequent to the time of manufacture of the product. The art is divided into three general ways of accomplishing this end. One way is to add the urea directly to the resin. Here it appears to tie up free formaldehyde that may be present in the resin. In effect, the molar ratio of formaldehyde to urea is decreased. This approach is exemplified in British Pat. No. 1,480,096. It is further discussed in British Pat. No. 2,019,854 and by A. A. Moslemi in *Particleboard* Volume I, Southern Illinois University Press, Carbondale (1974). This idea is attractive in its simplicity but it has not been particularly successful. Physical properties of the resultant product are severely affected when enough urea is added to gain significant reduction of formaldehyde evolution.

Another approach developed out of the failure of the one just described. This involved isolation of the urea from the resin in some manner so that it does not interfere with resin curing but is available later to scavenge formaldehyde. This often involves applying a solution of urea to the wood particles, for example as taught in British Pat. Nos. 2,019,854; or to a portion of the particles as in German Pat. No. 1,653,167; or to an inert carrier material, as in U.S. Pat. No. 3,983,084, in which a mixture of urea and an amylaceous material is added to the binder system. Again, the ideas are excellent in concept but in actuality none of these references cited seem able to reduce formaldehyde evolution to more than about 50% of the untreated level. Much better control has been a sought-after goal.

A third approach can be mentioned. This involves reformulation of the resins themselves, usually in the direction of lower molar ratios of formaldehyde to urea. Finally, other materials besides urea have been suggested, as in U.S. Pat. No. 4,186,242, in which ammonium lignosulfonate is used, or in U.S. Pat. No. 2,870,041 in which bisulfites are suggested for odor control in textiles. German DT 2847-975 shows the use of urea for formaldehyde absorption in pharmaceutical and cosmetic preparations. These approaches either stray away from practicality in the manufacture of wood products or, like the others, fail to give adequate control of formaldehyde evolution. Even more so they do fail to solve the problem for a secondary manufacturer who must purchase panels on the open market for remanufacture. Yet to the present time the secondary manufacturer has had little or no control over such aspects of his ultimate product as formaldehyde evolution, even though he would be likely to bear the brunt of any product liability claims.

SUMMARY OF THE INVENTION

The present invention includes a composition and method for its use for reduction of formaldehyde emission from composite wood panels. In particular, it is an effective means for lowering the post-manufacturing formaldehyde emission of particleboard panels. Reductions in the range of 60–90% below the emission values of untreated panels can normally be readily attained. In order to accomplish this end, a composition of matter containing at least a mixture of urea and starch, and preferably also an acidic material effective as a catalyst for a urea-formaldehyde resin is added to the particle furnish before the forming and pressing operations.

Particleboards are normally manufactured using 4.5 to 12 parts by weight on a solids basis of a thermosetting aminoplast binder resin to each 100 parts of comminuted wood furnish. These resins are typically based on urea-formaldehyde condensation products. Many modifications are also suitable. For example, the binder resin may be a melamine-formaldehyde product or a melamine modified urea-formaldehyde condensate. The resin is most usually added as an aqueous solution to the dried wood particles in a blender. In a preferred form of the present invention an effective amount of a formaldehyde reducing composition will also be sprayed on the wood particles in the blender. However, in most cases, it is equally effective for the composition to be added directly to the binder resin although this may reduce the pot life of the resin somewhat. The composition will comprise urea and a carbohydrate based material which may be water soluble sugars, water soluble or gelled starches, or water soluble or water dispersable cellulose derivatives, or mixtures of these materials. The urea in this aqueous composition should be in the range of 20–60% by weight and more preferably in the range of 30–45 percent by weight. From 0.4–3 parts of the above composition, based on the amount of urea present, may be added to each 100 parts of comminuted wood solids. A preferable amount is from 0.5 to 2 parts of the composition. In the composition itself, the ratio of urea to carbohydrate based material will range from 10:1 to 40:1 and is preferably about 15:1 to 25:1. It is further desirable for the composition to contain an acidic salt which is effective as a resin curing catalyst. A preferred group of salts is ammonium chloride, ammonium sulfate, ammonium nitrate, or mixtures of these materials. Acidic salts will normally form from 0.5 to 5% by weight of the aqueous composition. The composition may further contain a small amount of formaldehyde, typically 0–2% by weight of the urea, which appears to act as a stabilizing agent. It may further contain a buffering material to hold the final pH of the composition in the neighborhood of 5.0–6.0. The buffer helps to retard the tendency of the catalyst to cause precure of the resin prior to pressing.

A preferred carbohydrate based material is a natural starch, such as, corn, wheat, rice, or potato. This can either be an uncooked or precooked type or it can be a chemically modified type such as hydroxyethylated starch. Sugars such as sucrose, glucose, or fructose, are also suitable carbohydrate based materials. Among the cellulose derived materials which are suitable in the composition can be mentioned water soluble grades of carboxymethyl cellulose, hydroxyethyl cellulose, or methyl cellulose.

It will be appreciated by those skilled in the art, that there are many related or analogous materials which can be readily substituted for the various components of the present invention.

After the resin and formaldehyde emission reducing composition are added to the wood particles, they are normally formed into mats and hotpressed into large panels.

Depending on a number of factors, of which ultimate board density, mat moisture content, and ratio of formaldehyde to urea in the resin are perhaps the most important, the use of the additive composition of the present invention can reduce formaldehyde emission of the finished panels by as much as 90% below the value of untreated panels. In general, values will be lower as the panel density increases or as the molar ratio of formaldehyde to urea in the binder resin is reduced.

It is an object of this invention to provide a composition of matter which will effectively reduce the formaldehyde emission of composite wood panels bonded by an aminoplast resin.

It is a further object to provide a method for the reduction of formaldehyde emission in composite wood panels bonded with an aminoplast resin in which the formaldehyde emission is significantly reduced with little or no effect on the physical strength of the panels.

It is a further object to provide a method for the reduction of formaldehyde emission from aminoplast bonded composite wood panels which is simple and inexpensive and does not require any increase in pressing time for the panels.

These and other objects will become readily apparent upon reading the following detailed description of the invention.

DESCRIPTION OF THE PREFERRED EMBODIMENTS

The use of the term percent (%) has ambiguous meaning in the wood products industry. Normally it refers to parts by weight of some material in reference to 100 parts of dry wood. Thus, if wood is said to contain 12% moisture, it would contain 12 kg of water per 100 kg of dry wood substance. Likewise, when a composite product is said to contain 5% resin, it contains 5 kg of dry resin solids for each 100 kg of dry wood solids. The term percent (%) is used in this context in the present description in order to keep it consistent with wood industry terminology. The following exception is made, however. When referring to the composition of the additive material, percentages will be used in the context found in the chemical industry; i.e., weight of a component multiplied by a factor of 100 and divided by the total weight of composition. Thus, if the additive composition is said to contain 30% urea, it contains 30 kg of urea per 100 kg of total composition.

It has been unexpectedly found that by adding a composition comprising a cooked or gelled starch, urea or one of its chemical analogs, and preferably a small portion of an acidic salt to either the wood particles or the binder resin, a finished panel is produced which has a low absolute rate of residual formaldehyde emission with little or no reduction in physical strength properties. In particular, there is little or no reduction in internal bond. This test is generally believed to be the best general indicator of board quality. It is carried out be cementing the faces of a small square of board, typically about 5×5 cm, to metal jigs. These are then placed in clamps and the specimen is placed under tensile stress along the z-axis until failure occurs.

While some of the methods outlined in the prior art for reduction of formaldehyde emission are at least partially effective, all of them seem to have a major deficiency in that they seriously reduce the internal bond value of the board. It is not fully understood why the present composition has overcome this earlier deficiency. It has been noted that the carbohydrate-based materials which have been found to be effective will all form complexes with urea to a greater or lesser extent. There is a good indication that the lower molecular weight materials can complex more urea than the higher molecular weight carbohydrate based product. In some instances, the carbohydrate can complex several times its own weight of urea. This phenomenon is offered here only as an observation and it is not known whether this is in some way related to the superior results achieved by the present invention The following examples will serve to show the best mode known for practicing the present invention.

EXAMPLE 1

The particleboard discussed in the subsequent examples is manufactured by the following general procedure. Furnish is mixed western softwoods, typically about 80% Douglas-fir with the balance being western hemlock and true firs. About half of the furnish is from green and dry planer shavings with the rest being green and dry sawdust. A small amount of reclaimed material;

e.g., reground edge trimmings, is also normally included.

The furnish is initially run over a screen and the fines are retained without further refining. Coarse shavings are ground in a hammermill or knife ring-type refiner while the coarse sawdust fraction is reduced in a double disc refiner. Normally the green sawdust is partially dried before refining. Ground particles are then dried to about 3–4% moisture content in direct fired dryers and sent to storage bins.

When needed for use, the various particle streams are drawn from the bins and passed over weigh belts to a high speed paddle blender where the other ingredients are added. When a fines surfaced or three-layer board is being made, the ground sawdust from the disc refiners is treated separately for use as the surface layers. Single-layer or homogeneous boards are made with only material from the shavings refiners.

Resin, or a resin-water mixture, is sprayed on the particles in the blender through a parallel set of spray nozzles. Normal usage is 6 parts of urea-formaldehyde resin solids per 100 parts by weight of dry basis wood particles. About 0.3 parts of molten crude slack wax is added through a single spray nozzle. Any other additives, such as the ones that comprise the present invention, are also added here through separate spray nozzles. Water is mixed with the resin as needed to achieve moisture contents of about 8% in the core and 9% in the face particles.

Particles from the blenders flow to one of four forming heads. Two lay down the respective faces and the other two form the interior portion of the boards. The mats, now on cauls, are rough trimmed to size. Material removed from the edges and ends is directly recycled to the core formers. Trimmed mats are weighed and deviations from the desired norm are fed back to the formers where any necessary adjustments are made. Immediately before pressing the mats are given a very light surface water spray.

The present process employs a 14 opening press having the capability of making finished boards 1.52 × 7.32 meters (5 × 24 ft) in size. Mats on their cauls are charged into the press which takes about 20 seconds to reach full pressure and about 45 seconds to reach final thickness. For nominal 16 mm (5/8 in.) board, total press time ranges from 220–210 seconds, including the 45 second close time and a 20 second decompression interval. After pressing the boards are passed run through a cooler, rough trimmed and then stacked in readiness for final trimming, packaging and shipping.

It will be appreciated by those skilled in the art that there is considerable variation between euipment and procedures in different particleboard mills and that the present invention is not limited for use with the procedure or equipment described.

EXAMPLE 2

As was discussed in the background, various inventors have recognized the usefulness of urea and its homologs as formaldehyde scavengers and have sought ways to overcome its deleterious effects on physical properties. One such method is adding urea to the wet wood particles before drying. In an effort to duplicate this work, a 30% urea solution was sprayed on the wet furnish while on the conveyor leading to the dryer. There was about 30 seconds diffusion time before the particles entered the dryer. Equal amounts of urea were added to face and core furnishes at levels of 1 and 2 parts per hundred parts wood (phw). Core resin was Chembond 5035 (Chembond Corp., Springfield, Oregon) and the face resin Reichhold 21-152 (Reichhold Chemicals, White Plains, N.Y.). These were used at levels of 6 phw (or 6%). Each of these resins is believed to have a molar ratio of formaldehyde to urea of about 1.35. It is normal practice in particleboard manufacture to use a core resin having a somewhat faster cure speed than that of the face resin. Properties of the panels made in this run are given in the following table.

TABLE 1

| Urea phw[1] | Press Time sec | Sample Size[2] | kg/m[3] | Modulus of Rupture MPa | Modulus of Elasticity GPa | Internal Band kPa | Formaldehyde μL/L[3] |
|---|---|---|---|---|---|---|---|
| 0 | 210 | 4 | 770 | 17.5 | 2.54 | 736 | 2.37 |
| 1 | 225 | 8 | 723 | 14.0 | 2.15 | 540 | 0.58 |
| 2 | 250 | 4 | 715 | 11.1 | 1.92 | 292 | 0.31 |

[1] parts per hundred parts dry wood
[2] number of individual specimens tested
[3] simulator test The reduced physical properties of the material to which urea was added are quite evident. These poor properties are in part related to the lower densities which were caused by springback as the boards came out of the press. The springback was, in turn, believed to be caused by poor resin cure in the interior of the boards due to the inhibiting effect of the urea.

The simulator test for formaldehyde emission can determine relative rates of emission from small samples of various products in a controlled environment. Samples of product to be tested are wrapped in foil, sealed in a plastic bag and stored in a refrigerator until the day immediately prior to testing. Preferred specimen size is 125 × 125 mm, although other sizes can be used as long as surface:edge area ratio remains fairly constant. Specimen surface area (both sides, but not including edges) is about 32,000 mm². On the evening before testing, they are removed from cold storage and allowed to warm to room temperature overnight. Then they are unwrapped, weighed and placed in a 19 L stainless steel box. The box is sealed and air at 50% RH and 23°–25° C. is pumped into the box at 1.5 L/min for 15–20 min. Then the air flow is adjusted to 1.0 L/min, the air outlet tube is connected to a double impinger, and air is passed through 1% $NaHSO_3$ solution in the impingers for 60 min. The impinger solutions are analyzed by the NIOSH chromotropic acid analysis method. This is a spectrophotometric measurement of color development in a chromotropic acid solution in the presence of sulphuric acid. Results are expressed as microliters (μL) of formaldehyde per liter (L) of air. These units are the volumetric equivalent of parts per million.

EXAMPLE 3

The formaldehyde suppressing additive of the present invention was made as follows:

TABLE 1

| | |
|---|---|
| Water | 59.43 |
| Starch[1] | 1.85 |
| Sulfuric acid | 0.0085 |
| Urea | 36.41 |
| Ammonium sulfate | 0.72 |
| 37% Formalin | 1.35 |
| Triethylamine | 0.24 |
| | 100.00 |

[1]Cleargel A 51-6166, National Starch and Chemical Corp., Bridgewater, New Jersey.

The water and starch are mixed and the acid is added to adjust pH to about 3.0. This mixture is then heated to a boil and held there for about 20 minutes. The urea and ammonium sulfate, which serves as a catalyst, are added and dissolved with agitation. Finally, the formalin and triethylamine are added. The latter material serves as a buffer to hold the pH between 5 and 6.

EXAMPLE 4

A series of runs of a 19-mm underlayment grade particleboard were made using no additive, the additive of Example 3, and the additive of Example 3 with the starch omitted. In underlayment grades, the particle furnish is of uniform size distribution throughout the board although it is common practice to use different resin types and/or amounts in the face and core portions. All boards in the present trial were made using 6.0% resin in the core portion and 5.5% resin in the surfaces. Each surface portion comprised about 25% of the board weight. When additives were used they were employed in amount which added 0.9% urea to the surface particles and 0.6% to the core particles. Press times on all boards was 200 seconds. The results of these runs is summarized in the following table.

TABLE 2

| Run No.[1] | Additive Used | Sample Size | Density, kg/m$^3$ | Modulus of Rupture, MPa | Modulus of Elasticity, GPa | Internal Bond kPa | Formaldehyde μL/L |
|---|---|---|---|---|---|---|---|
| 1 | None | 4 | 744 | 15.8 | 2.50 | 690 | 2.70 |
| 2 | Ex. 3 | 16 | 737 | 15.1 | 2.37 | 861 | 0.99 |
| 3 | Ex. 3 (w/o starch) | 12 | 729 | 14.0 | 2.28 | 536 | 0.83 |

[1]The boards of run numbers one and three were made using Chembond 5077 resin. The boards of run number 2 were made using PRC 3501 resin (Pacific Resins and Chemicals, Tacoma, Washington). These resins have very similar properties.

It can be readily seen from the data that the additive of run 2 reduced formaldehyde evolution, as measured by the simulator test, by 63% without significantly affecting physical properties of the boards.

The additive without starch showed a slightly greater formaldehyde reduction but there was a marked deterioration in board quality. This is particularly the case in the internal bond value which is considered the best overall indicator of board quality.

EXAMPLE 5

During a 12 day mill run, four products were manufactured. These were a floor underlayment grade particleboard made in thicknesses ranging between 6-19 mm, with and without the additive of the present invention, and 16 or 19 mm mobile home decking made with and without the additive. These were made essentially as described in the foregoing examples. All runs were made over a sufficiently long period of time so that much of the normal mill operating variability would be pooled into the samples tested.

Formaldehyde evolution was analyzed by a test better adapted for mill quality control than the test described earlier. A sample of board from production is sanded, then cut in 150×150 mm size. Four 12.7 mm holes are drilled through the specimen, one near each corner. The sample is cooled at room conditions for 24 h, then 5 mL of distilled water is placed in a 60 mm petri dish and the dish is placed in the center of the sample. This is covered with a 125×65 mm crystallizing dish for 30 min. Then a 2 mL aliquot of the water is analyzed for absorbed HCHO with the acetylacetone analysis method. If the sample has a very high level of formaldehyde evolution, a smaller aliquot may be required. The water aliquot is mixed with 2 mL of a solution containing 154 g ammonium acetate, 2 mL of acetylacetone and 3 mL glacial acetic acid per liter. The mixture of sample and reagant is allowed to stand for 10 minutes in a water bath at 60°-65° C. Color at 412 nm is read on a spectrophotometer. The rate of formaldehyde evolution is calculated by comparison with data developed during a calibration run and is expressed as μg formaldehyde evolved during the test. Correction for temperature at time of measurement will improve reproducibility. This test has a strong linear correlation with the one described in Example 2.

Underlayment type boards were made using 5.5±0.3% of a reduced molar ratio (F/U≅1.1-1.2) urea-formaldehyde resin in both face and core portions. The mobile home decking type used 5.5±0.3% resin in the face and 6.0±0.3% in the core portions. When additive was used it was made according to the procedure described in Example 3. In those underlayment products that used additive, 1.0% (based on urea added to dry wood) was used in the surface layers and 0.5% in the core. The equivalent amounts for mobile home decking were 0.9% in the surface and 0.5% in the core.

Results of these runs are summarized in Table 3.

TABLE 3

| Product Type | Additive Use | Sample Size | Density kg/m$^3$ | Modulus of Rupture MPa | Internal Bond kPa | Formaldehyde μL/L |
|---|---|---|---|---|---|---|
| Underlay | No | 3 | 750 | 13.8 | 565 | 11.0 |
| Underlay | Yes | 19 | 734 | 11.4 | 572 | 3.2 |
| Decking | No | 26 | 801 | 17.0 | 800 | 7.2 |
| Decking | Yes | 24 | 770 | 14.8 | 738 | 2.4 |

It can be readily seen that there was only a minor reduction in bending strength, most of which can be attributed to the slightly lower average densities of the material containing the additives. Internal bond was essentially unaffected by the additive usage and there is no statistically significant difference between the treated samples and controls. A major reduction in formaldehyde evolution, averaging about 70%, is the principal difference in the material containing the additive.

It will be clear to those skilled in the art that many minor changes can be made in the process and composition described without departing from the spirit of the invention.

What is claimed is:

1. A composition of matter comprising 20–60% urea; 0.5–5% of a carbohydrate based material selected from the group of sugars, starches, water-soluble or water-dispersable cellulose derivatives, or mixtures thereof; 0.5–5% of an acidic salt effective as a thermosetting aminoplast resin curing agent, and 0–2% formaldehyde based on the amount of urea present and where the ratio of urea to carbohydrate based material is in the range of 10:1 to 40:1.

2. The composition of claim 1 in which the acidic salt is selected from the group of ammonium chloride, ammonium sulfate, ammonium nitrate, or mixtures thereof.

3. The composition of claim 1 in which a buffer is additionally present to stabilize pH in the range of 5.0–6.0.

4. The composition of claims 1, 2, or 3 in which the carbohydrate based material is a cooked starch.

5. An aqueous composition of matter comprising 35–45% urea; 1–2% cooked starch; 1–2% of an acidic salt from the group of ammonium chloride, ammonium sulfate, ammonium nitrate, or mixtures thereof; 0–2% formaldehyde based on urea; and 0–0.8% triethylamine.

* * * * *